(12) United States Patent
Vanneman et al.

(10) Patent No.: US 10,202,726 B2
(45) Date of Patent: Feb. 12, 2019

(54) PAINT-STRIPING LASER GUIDANCE SYSTEM AND RELATED TECHNOLOGY

(71) Applicant: Laserline Mfg., Inc., Redmond, OR (US)

(72) Inventors: Robert W. Vanneman, Bend, OR (US); Timothy A. Treichler, Redmond, OR (US)

(73) Assignee: LaserLine Mfg., Inc., Redmond, OR (US)

( * ) Notice: Subject to any disclaimer, the term of this patent is extended or adjusted under 35 U.S.C. 154(b) by 0 days.

(21) Appl. No.: 15/492,851

(22) Filed: Apr. 20, 2017

(65) Prior Publication Data

US 2017/0218578 A1 Aug. 3, 2017

Related U.S. Application Data

(62) Division of application No. 14/710,437, filed on May 12, 2015, now Pat. No. 9,644,331.

(60) Provisional application No. 61/992,695, filed on May 13, 2014.

(51) Int. Cl.
| | |
|---|---|
| *E01C 23/16* | (2006.01) |
| *E01C 23/22* | (2006.01) |
| *G01B 11/27* | (2006.01) |
| *G02B 23/00* | (2006.01) |

(Continued)

(52) U.S. Cl.
CPC .......... *E01C 23/163* (2013.01); *E01C 23/122* (2013.01); *E01C 23/222* (2013.01); *E01F 9/518* (2016.02); *G01B 11/272* (2013.01); *G02B 23/00* (2013.01)

(58) Field of Classification Search
CPC ...... E01C 23/22; E01C 23/163; E01C 23/222; G02B 23/00; G01B 11/272
See application file for complete search history.

(56) References Cited

U.S. PATENT DOCUMENTS

| | | | | |
|---|---|---|---|---|
| 3,821,932 A | * | 7/1974 | Theurer | E01B 33/02 104/7.2 |
| 4,624,602 A | * | 11/1986 | Kieffer | E01C 23/22 118/305 |

(Continued)

OTHER PUBLICATIONS

L58 Laser, copyright Laser Tools Co, Inc. 2003, 2 pages.

*Primary Examiner* — Abigail A Risic
(74) *Attorney, Agent, or Firm* — Perkins Coie LLP

(57) ABSTRACT

A system configured in accordance with a particular embodiment includes a paint-striping machine having a carriage, an outrigger operably connected to the carriage, and a downwardly oriented nozzle carried by the outrigger. The carriage moves along pavement while the nozzle dispenses paint, thereby forming a paint stripe on the pavement. The system further includes a guidance system operably connected to the paint-striping machine. The guidance system includes a light-emitting device and a mounting and containment assembly that provides an adjustable connection between the light-emitting device and the paint-striping machine. The light-emitting device forms a planar light region having a vertical orientation. The mounting and containment assembly includes an adjustment mechanism operable to move the light-emitting device relative to the paint-striping machine, thereby changing a yaw angle of the planar light region.

20 Claims, 13 Drawing Sheets

(51) Int. Cl.
*E01C 23/12* (2006.01)
*E01F 9/518* (2016.01)

(56) References Cited

U.S. PATENT DOCUMENTS

| | | | | |
|---|---|---|---|---|
| 4,893,751 A * | 1/1990 | Armstrong | E01C 23/22 | 118/305 |
| 5,052,854 A * | 10/1991 | Correa | E01C 23/163 | 180/169 |
| 6,811,351 B1 * | 11/2004 | Schroeder | E01C 23/163 | 404/93 |
| 7,654,771 B2 * | 2/2010 | Schroeder | E01C 23/22 | 404/93 |
| 2008/0205984 A1 * | 8/2008 | Schroeder | E01C 23/22 | 404/93 |
| 2009/0087263 A1 * | 4/2009 | Martinez | E01C 23/166 | 404/94 |
| 2010/0266756 A1 * | 10/2010 | Knutson | E01C 23/163 | 427/137 |
| 2012/0056020 A1 * | 3/2012 | Philpotts | A63C 19/065 | 239/722 |
| 2012/0269576 A1 * | 10/2012 | Koch | E01C 23/227 | 404/94 |
| 2014/0111813 A1 * | 4/2014 | Hamar | G01B 11/14 | 356/614 |
| 2014/0120251 A1 * | 5/2014 | Grimm | E01C 23/222 | 427/137 |
| 2015/0199576 A1 * | 7/2015 | Ichikawa | E01C 19/48 | 382/104 |
| 2015/0290673 A1 * | 10/2015 | Duncan | G01C 3/08 | 427/137 |
| 2016/0002868 A1 * | 1/2016 | McGuffie | A63C 19/065 | 427/137 |
| 2016/0207061 A1 * | 7/2016 | McGuffie | E01C 23/22 | |
| 2016/0222607 A1 * | 8/2016 | Kieffer | E01H 1/056 | |

* cited by examiner

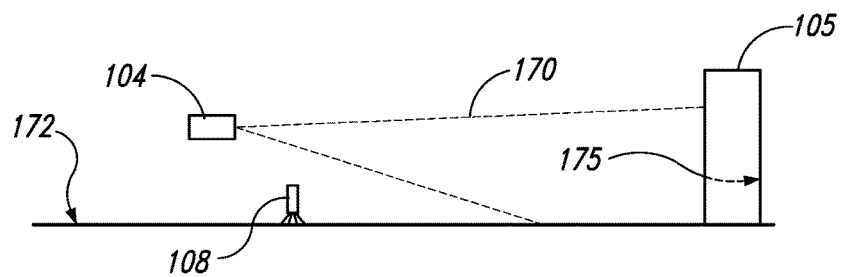
*Fig. 9*
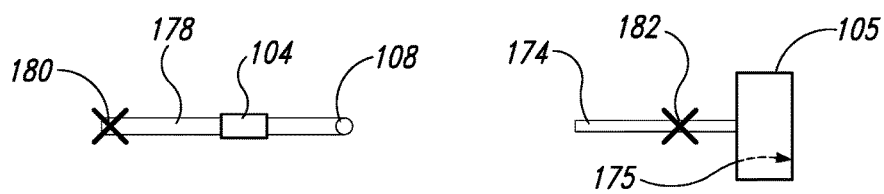
*Fig. 10*
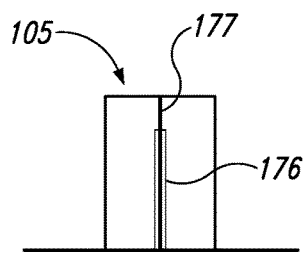 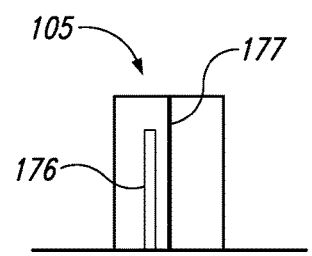
*Fig. 11*      *Fig. 12*

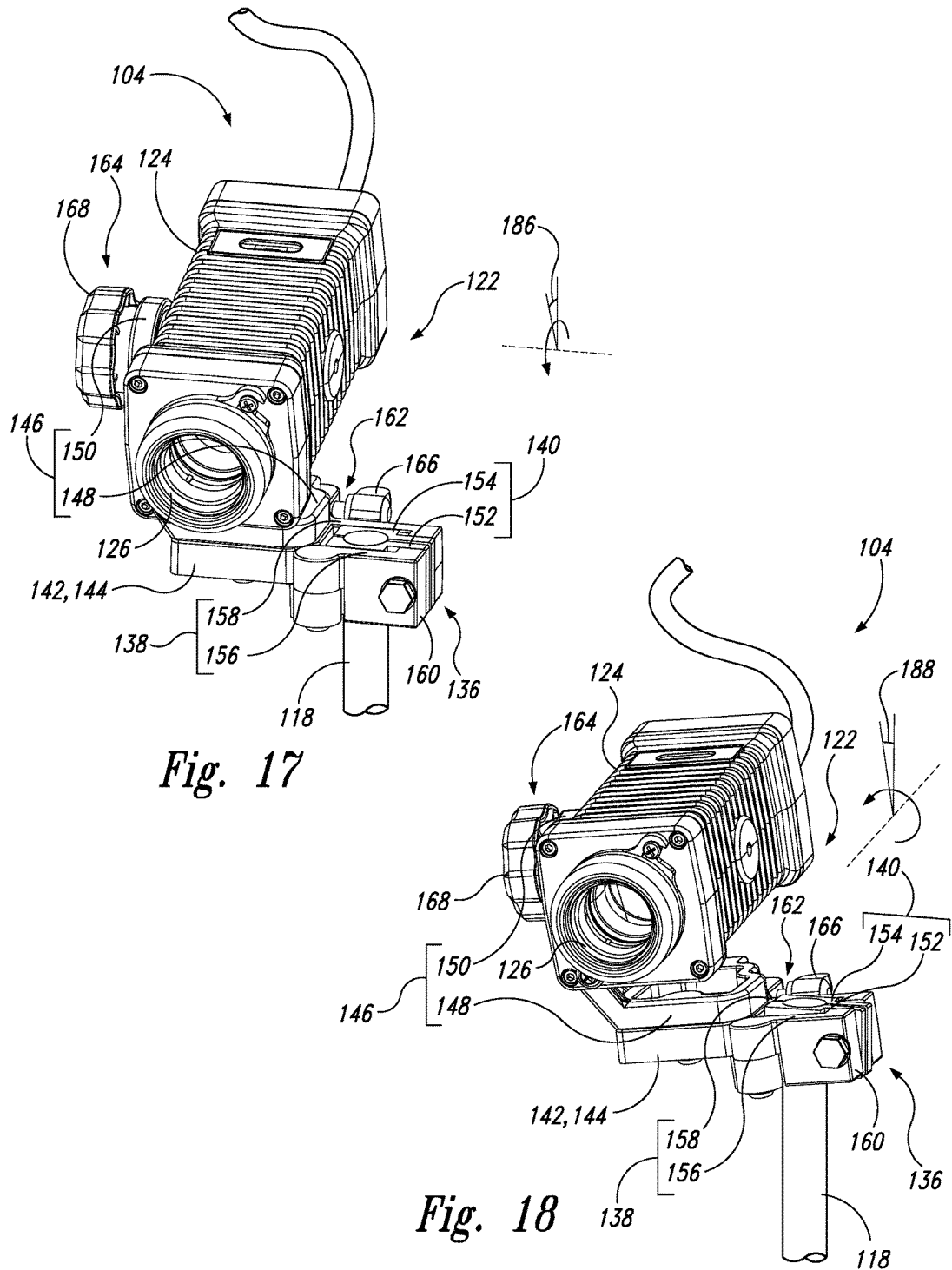

PAINT-STRIPING LASER GUIDANCE SYSTEM AND RELATED TECHNOLOGY

CROSS-REFERENCE TO RELATED APPLICATION

This application is a divisional of U.S. patent application Ser. No. 14/710,437, filed May 12, 2015, which claims the benefit of U.S. patent application Ser. No. 61/992,695 filed May 13, 2014. The foregoing applications are incorporated herein by reference in their entireties. To the extent the foregoing applications or any other material incorporated herein by reference conflicts with the present disclosure, the preset disclosure controls.

TECHNICAL FIELD

The present technology is related to reference systems for guiding parking-lot line painting operations and other types of linear alteration of underfoot surfaces.

BACKGROUND

Linear alteration of underfoot surfaces is a common construction and maintenance task that, using conventional technology, tends to be unduly cumbersome. For example, a project involving painting lines on pavement to delineate parking spaces using conventional technology is likely to begin with a time-consuming layout process. In a particular example of such a process, a crew first marks beginning and ending points of each line to be painted. Next, the crew affixes a string at one of the beginning and ending points of a given line. The crew then affixes the string at the other of the beginning and ending points of the given line. When the string is taut, the crew presumes it to be an accurate representation of a straight path between the beginning and ending points of the given line. The crew then marks the path based on the position of the string and repeats the same process for each of the remaining lines to be painted. To mark the path, the crew may, for example, either "snap" the line to leave behind a chalk marking or walk along the path and paint dashes, dots, or other indications of the path at intermittent positions along the length of the string. Finally, the crew uses the mark or marks to guide movement of a paint-striping machine that applies paint along the path. As discussed below, this approach to painting lines and other approaches to the same and other types of linear alteration of underfoot surfaces have certain limitations and/or disadvantages. Accordingly, there is a need for innovation in this field.

BRIEF DESCRIPTION OF THE DRAWINGS

Many aspects of the present disclosure can be better understood with reference to the following drawings. The components in the drawings are not necessarily to scale. Instead, emphasis is placed on clearly illustrating the principles of the present technology. For ease of reference, throughout this disclosure identical reference numbers may be used to identify identical or at least generally similar or analogous components or features.

As shown in FIG. 1, the paint-striping system can include a paint-striping machine, a guidance system, and a portable target. The paint-striping machine can include a first outrigger and a second outrigger.

FIGS. 9 and 10 are, respectively, a partially schematic profile view and a partially schematic top plan view of the paint-striping system shown in FIG. 1 while the light-emitting device shown in FIG. 2B emits, toward the target, a planar light region having a vertical orientation.

FIG. 11 is a front profile view of the target shown in FIG. 1 while the planar light region shown in FIGS. 9 and 10 is in alignment with the target.

FIG. 12 is a front profile view of the target shown in FIG. 1 after the planar light region shown in FIGS. 9 and 10 moves out of alignment with the target.

FIG. 17 is a perspective view from the top and one side of the guidance system and the second outrigger shown in FIG. 1 after the mounting and containment assembly of the guidance system is adjusted relative to its position in in FIG. 15 to change a pitch angle of the planar light region shown in FIGS. 9 and 10.

FIG. 18 is a perspective view from the top and one side of the guidance system and the second outrigger shown in FIG. 1 after the mounting and containment assembly of the guidance system is adjusted relative to its position in in FIG. 15 to change a roll angle of the planar light region shown in FIGS. 9 and 10.

DETAILED DESCRIPTION

Figure 1:
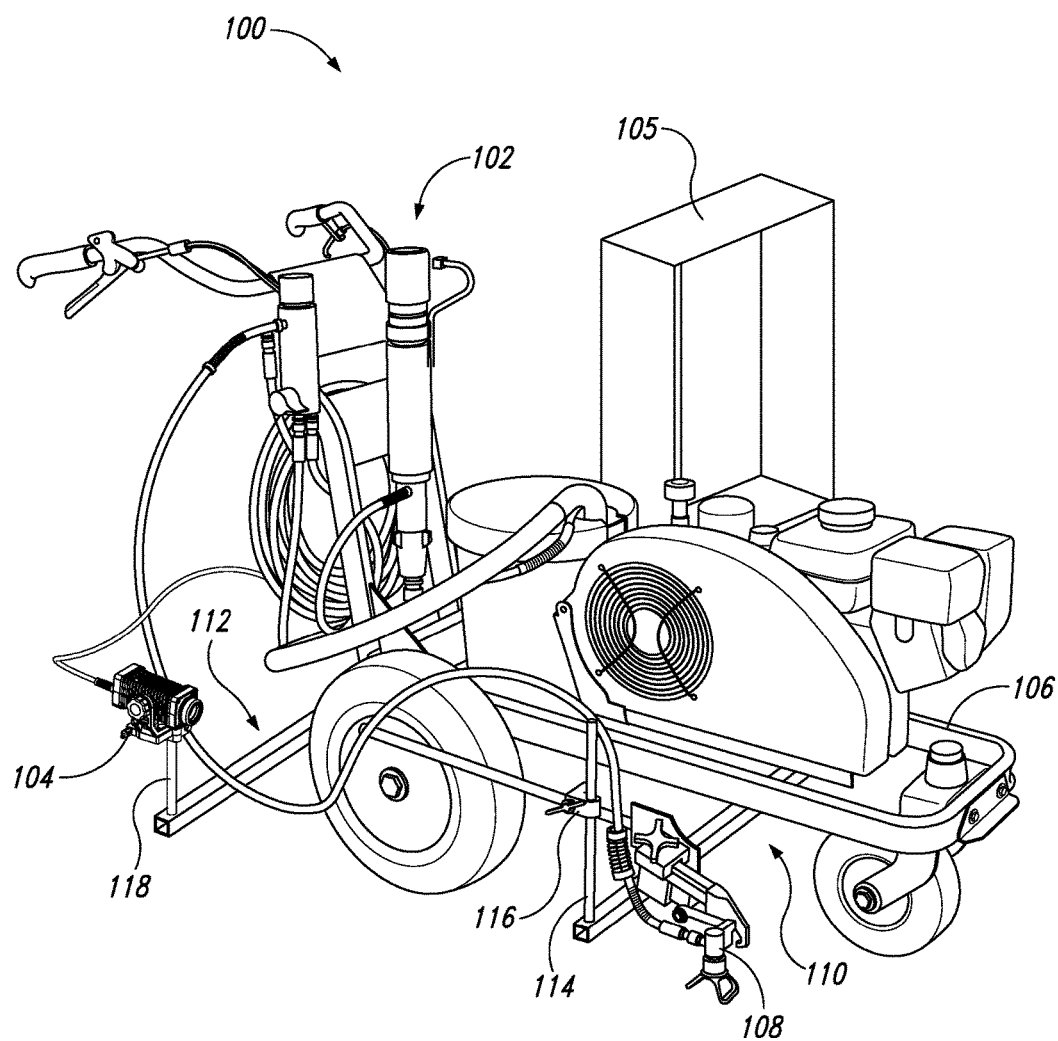
FIG. 1 is a perspective view from the top and one side illustrating a paint-striping system in accordance with an embodiment of the present technology.

Specific details of several embodiments of the present technology are disclosed herein with reference to FIGS.

1-24. Although these details may be disclosed herein primarily or entirely in the context of paint-striping applications, other applications are within the scope of the present technology. For example, systems, devices, and methods configured in accordance with at least some embodiments of the present technology can be used in the context of guiding movement of riding and walk-behind machines that perform types of surface modification other than painting (e.g., cutting, grinding, chalking, etc.). It should be noted that embodiments of the present technology can have different configurations, components, features, and procedures than those disclosed herein. Moreover, a person of ordinary skill in the art will understand that embodiments of the present technology can have configurations, components, features, and procedures in addition to those disclosed herein and that these and other embodiments can be without several of the configurations, components, features, and procedures disclosed herein without deviating from the present technology.

Conventional approaches to painting lines on pavement and other types of linear alteration of underfoot surfaces tend to be labor-intensive and imprecise. For example, in the background example described above, a crew of four is common, with a first member of the crew holding one end of the string, a second member of the crew holding the other end of the string, a third member of the crew marking the locations of the string, and a fourth member of the crew steering the paint-striping machine. This is highly inefficient. Furthermore, presuming that a taut string is an accurate representation of a straight path is dubious even under ideal conditions. In windy conditions, string lines tend to bow, particularly over long distances. String lines are also apt to snag on obstructions. Due to these and/or other problems, the straightness of a painted line laid out using a string tends to be suboptimal.

Systems, devices, and methods in accordance with embodiments of the present technology can at least partially address one or more of the problems discussed above and/or other problems associated with conventional technologies whether or not stated herein. In a particular example, a paint-striping system configured in accordance with an embodiment of the present technology includes a paint-striping machine and a guidance system operably connected to the paint-striping machine. The guidance system can be configured to form a planar light region having a vertical orientation. A visible indicator line can be formed where this planar light region projects onto an underfoot surface and/or a target surface. The visible indicator line can be used to guide movement of the paint-striping machine along a straight path even in the absence of layout markings between endpoints of the path. Guidance based on this visible indicator line can be highly reliable regardless of wind, rough terrain, and other conditions and features that would tend to adversely affect the performance of conventional string lines. Furthermore, in contrast to guidance based on conventional string lines, guidance based on the visible indicator line may actually become increasingly reliable as the length of the path increases (e.g., because greater distance may tend to attenuate minor calibration irregularities). Thus, use of the guidance system can reduce or eliminate the need for labor associated with forming endpoint-to-endpoint layout markings and provide reliable guidance that yields straighter lines than would be achieved using conventional technologies. These advantages and other aspects of systems in accordance with at least some embodiments of the present technology are further discussed below with reference to FIGS. 1-21.

FIG. 1 is a perspective view from the top and one side illustrating a paint-striping system 100 in accordance with an embodiment of the present technology. The paint-striping system 100 can include a paint-striping machine 102 and a guidance system 104 operably connected to the paint-striping machine 102. The paint-striping system 100 can further include a portable target 105. The paint-striping machine 102 can include a carriage 106 configured to move along pavement, and a downwardly oriented nozzle 108 configured to dispense paint and thereby form a paint stripe on the pavement as the carriage 106 moves along the pavement. The paint-striping machine 102 can further include a first outrigger 110 and a second outrigger 112 both operably connected to the carriage 106, with the second outrigger 112 being rearwardly positioned relative to the first outrigger 110. The first and second outriggers 110, 112 can carry the nozzle 108 and the guidance system 104, respectively. For example, the first outrigger 110 can include a first elongate vertical rod 114 and a coupler 116 that releasably connects the nozzle 108 to the first rod 114. The coupler 116 can be repositionable along a length of the first rod 114 to change a height of the nozzle 108 relative to the pavement. The second outrigger 112 can include a second elongate vertical rod 118 to which the guidance system 104 is operably connected.

Figures 2A, 2B:
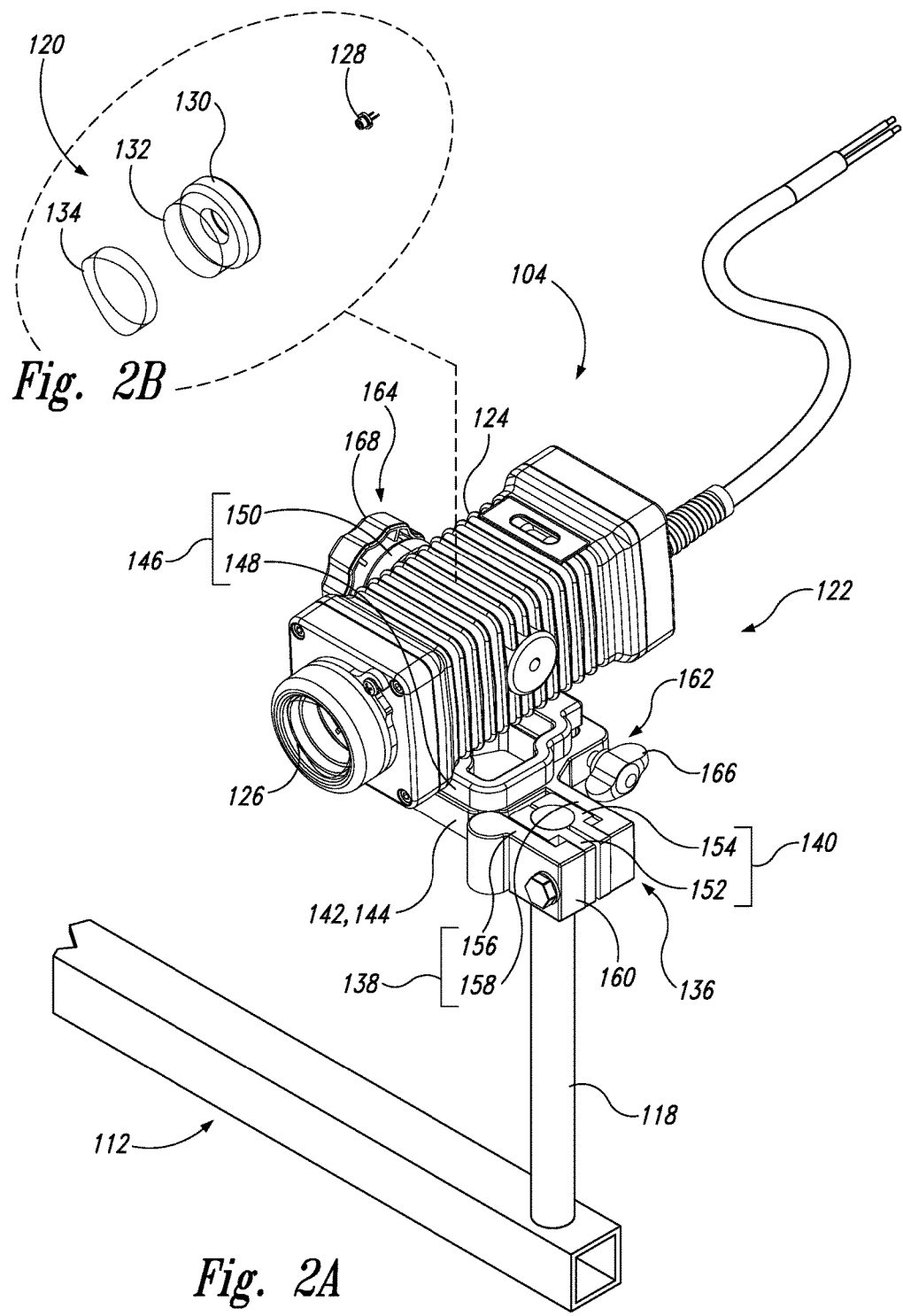
FIG. 2A is a perspective view from the top and one side of the guidance system and the second outrigger shown in FIG. 1.
FIG. 2B is a perspective view from the top and one side of a light-emitting device of the guidance system shown in FIG. 1.
Figure 3:
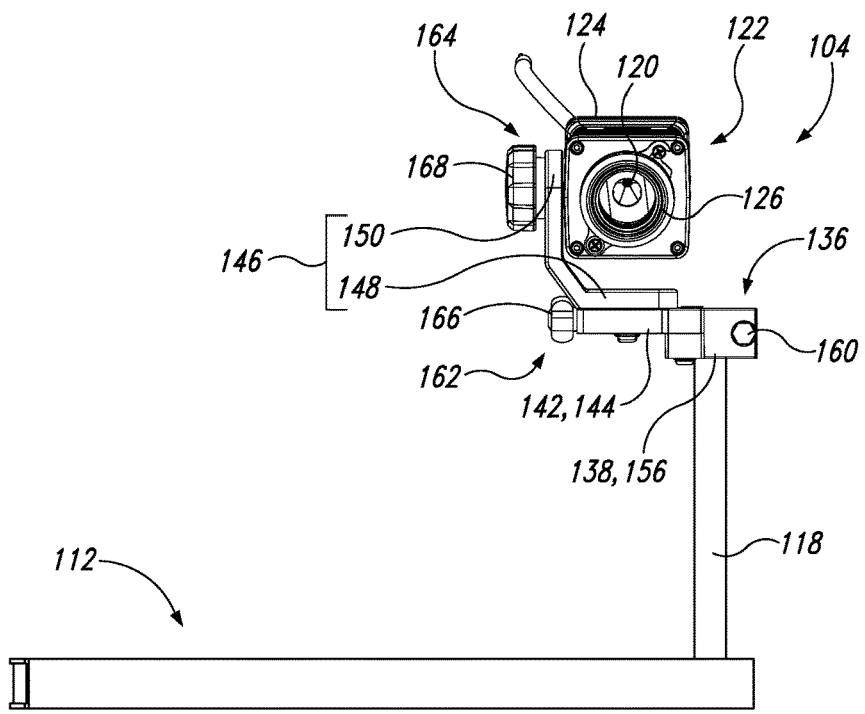
FIGS. 3, 4, 5, 6, 7 and 8 are, respectively, a front profile view, a rear profile view, a first side profile view, a second side profile view, a top plan view, and a bottom plan view of the guidance system and the second outrigger shown in FIG. 1.
Figure 4:
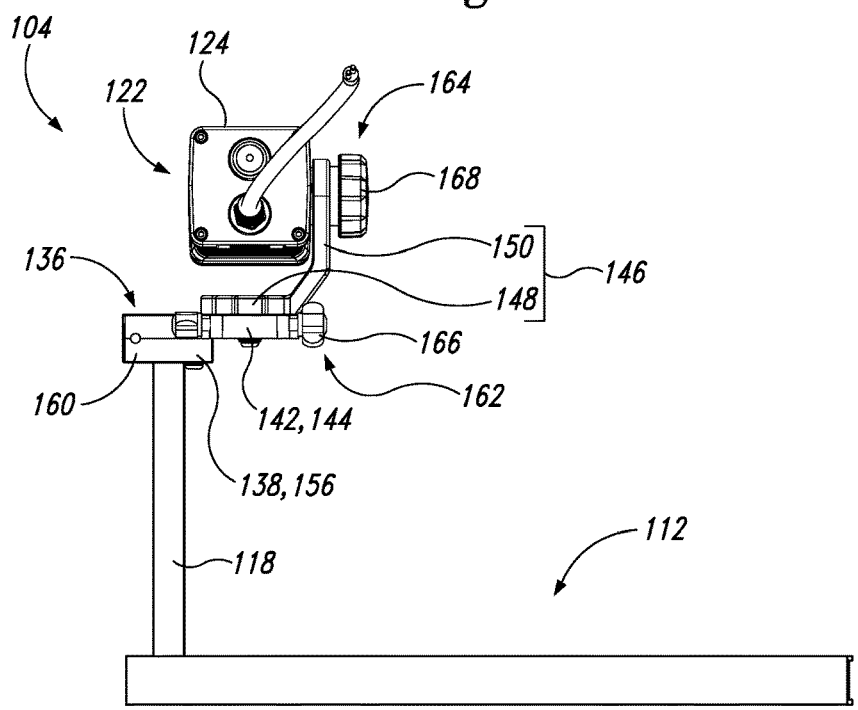
Figure 5:
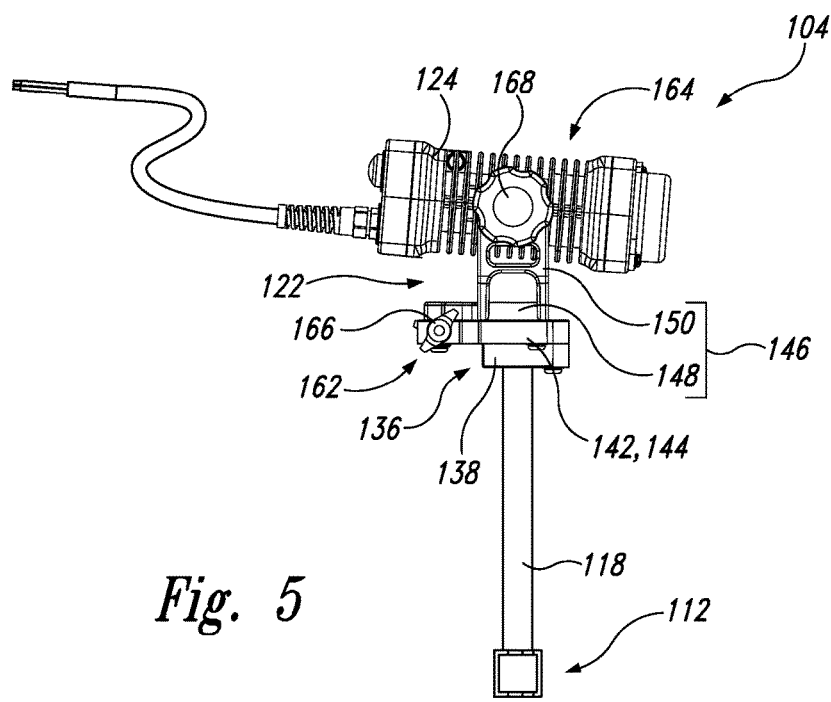
Figure 6:
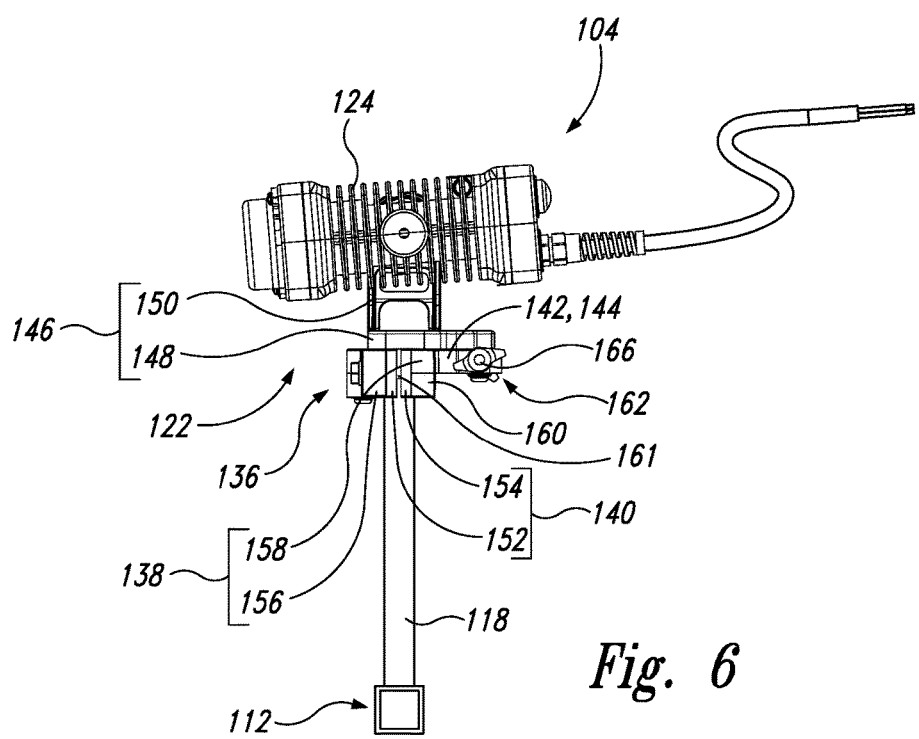
Figure 7:
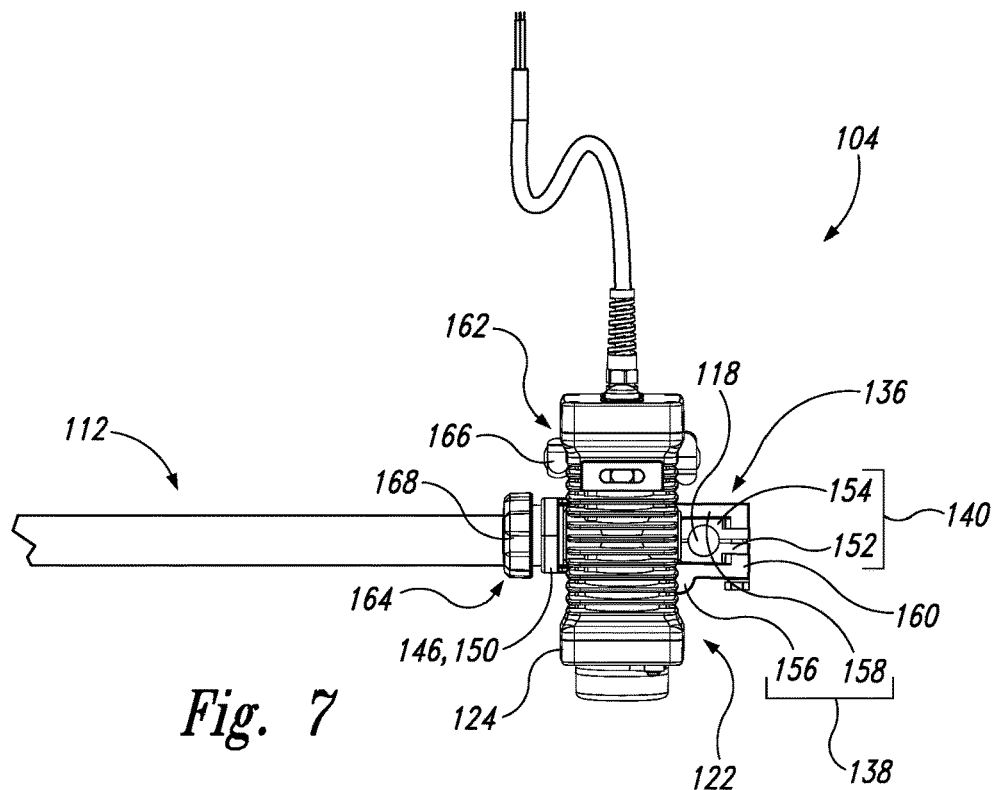
Figure 8:
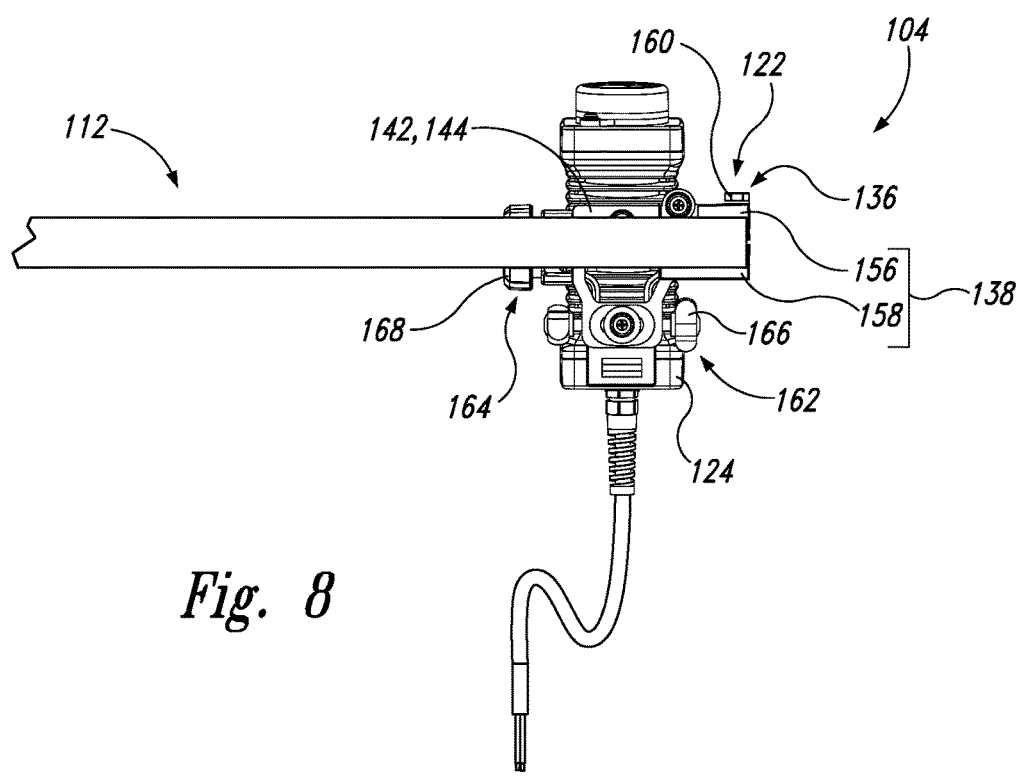

FIG. 2A is a perspective view from the top and one side of the guidance system 104 and the second outrigger 112. FIG. 2B is a perspective view from the top and one side of a light-emitting device 120 of the guidance system 104. FIGS. 3, 4, 5, 6, 7 and 8 are, respectively, a front profile view, a rear profile view, a first side profile view, a second side profile view, a top plan view, and a bottom plan view of the guidance system 104 and the second outrigger 112. As shown in FIG. 2A, the guidance system 104 can include a mounting and containment assembly 122 that contains the light-emitting device 120 and provides an adjustable connection between the light-emitting device 120 and the paint-striping machine 102. The mounting and containment assembly 122 can include a housing 124 having an optical exit 126. The light-emitting device 120 can be disposed within the housing 124 such that light from the light-emitting device 120 is projected outward from the guidance system 104 via the optical exit 126. As shown in FIG. 2B, the light-emitting device 120 can include a laser 128 (e.g., a laser diode), an aperture 130, a collimating lens 132, and a fan lens 134 operably associated with one another and positioned within the housing 124 successively closer to the optical exit 126. The aperture 130, the collimating lens 132, and the fan lens 134 can be configured to convert light from the laser 128 into a fan-shaped planar light region.

With reference to FIGS. 1-8 together, the mounting and containment assembly 122 can include a clamp 136 having a frame 138 and a gripper 140 inset within the frame 138. The gripper 140 can be configured to releasably grip the second rod 118. The mounting and containment assembly 122 can further include a support 142 operably connected to the clamp 136 and positioned to be at a first side of the second rod 118 when the gripper 140 releasably grips the second rod 118. For example, the clamp 136 can be positioned relative to the support 142 such that the frame 138 extends laterally from the support 142. The clamp 136 can be configured to grip the second rod 118 via the gripper 140 and thereby releasably secure the support 142 to the second outrigger 112. The support 142 can include a platform 144 and can carry the housing 124 via the platform 144. The clamp 136 can include a bracket 146 having a first flange 148 parallel and adjacent to the platform 144, and a second flange 150 parallel and adjacent to a sidewall of the housing 124.

The clamp 136 can be configured to be conveniently retrofitted for compatibility with rods having different transverse cross-sectional shapes. For example, as shown in FIG. 2A, the gripper 140, which conforms to a circular transverse cross-sectional shape of the second rod 118, can be removable and replaceable with a different gripper (not shown) that conforms to a different transverse cross-sectional shape of a different elongate rod (also not shown). The gripper 140 can include a first jaw 152 and an opposing second jaw 154 having respective concave inwardly facing surfaces that abut opposites sides of the second rod 118. The frame 138 can include a swing arm 156 hingedly connected to the support 142. The swing arm 156 can carry the first jaw 152 toward and away from the second jaw 154 to transition the clamp 136 between a closed state and an open state. The clamp 136 can include a clasp 160 that secures the clamp 136 in the closed state. In the illustrated embodiment, the clasp 160 includes a threaded axle 161 through which the frame 138 is rotatably connected to the gripper 140. The threaded axle 161 can be rotatable to increase a force exerted by the gripper 140 against the second rod 118. When the gripper 140 releasably grips the second rod 118, the clasp 160 can be positioned at a side of the second rod 118 opposite to a side of the second rod 118 at which the support 142 is positioned. In other embodiments, the clasp 160 can have other suitable forms.

The mounting and containment assembly 122 can be highly adjustable so that the light-emitting device 120 can be oriented as needed. For example, the mounting and containment assembly 122 can include a first adjustment mechanism 162 operable to move the light-emitting device 120 relative to the paint-striping machine 102 and thereby change a yaw angle of a planar light region produced by the light-emitting device 120. Similarly, the mounting and containment assembly 122 can include a second adjustment mechanism 164 operable to move the light-emitting device 120 relative to the paint-striping machine 102 and thereby change a pitch angle of the planar light region. In the illustrated embodiment, the first adjustment mechanism 162 includes a slider 166 that can be shifted left or right to pivot the bracket 146 relative to the platform 144. Also in the illustrated embodiment, the second adjustment mechanism 164 includes a knob 168 that can be rotated to pivot the housing 124 relative to the bracket 146. Thus, the first adjustment mechanism 162 can be slidably operable to change the yaw angle of the planar light region and the second adjustment mechanism 164 can be rotatably operable to change the pitch angle of the planar light region. This arrangement is expected to be highly intuitive for users of the guidance system 104. In other embodiments, the first and second adjustment mechanisms 162, 164 can have other suitable forms.

FIGS. 9 and 10 are, respectively, a partially schematic profile view and a partially schematic top plan view of the paint-striping system 100 while the light-emitting device 120 emits, toward the target 105, a planar light region 170 having a vertical orientation. In FIGS. 9 and 10, portions of the paint-striping machine 102 (FIG. 1) other than the nozzle 108 are omitted for clarity. FIG. 11 is a front profile view of the target 105 while the planar light region 170 is in alignment with the target 105. FIG. 12 is a front profile view of the target 105 after the planar light region 170 moves out of alignment with the target 105. With reference to FIGS. 1-12 together, when the paint-striping system 100 is in use, the paint-striping machine 102 and the target 105 can be at spaced apart positions on an underfoot surface 172 (e.g., an upper surface of parking-lot pavement). The light-emitting device 120 (FIG. 2A) of the guidance system 104 can emit light from the laser 128 via the aperture 130, the collimating lens 132, and the fan lens 134 to form the planar light region 170. The planar light region 170 can have a vertical orientation and can form a first visible guidance line 174 on the underfoot surface 172. The target 105 can have a reflective surface 175 that faces toward the paint-striping machine 102 such that the planar light region 170 forms a second visible guidance line 176 on the reflective surface 175. In the illustrated embodiment, the reflective surface 175 is deeply inset within the target 105. This can be useful, for example, to cause the reflective surface 175 to be shaded from sunlight and thereby to enhance the visibility of the second visible guidance line 176. As shown in FIG. 11, the target 105 can further include a non-reflective or otherwise visually distinctive alignment mark 177 (e.g., a vertical line) on the reflective surface 175. In other embodiments, the target 105 can have other suitable configurations.

As shown in FIG. 10, the paint-striping system 100 can be used to form a paint stripe 178 along a path extending between a first location 180 (e.g., a starting location) and a second location 182 (e.g., an ending location) on the underfoot surface 172. In FIG. 10, each of the first and second locations 180, 182 is temporarily marked with a chalk "x." Other suitable marks designating endpoint of the path include flags, paint spots, etc. To begin the paint stripe 178, the paint-striping machine 102 can be positioned such that the nozzle 108 is directly above the first location 180. The target 105 can be positioned such that the alignment mark 177 is aligned with the path extending between the first and second locations 180, 182. The paint-striping machine 102 can then be moved toward the target 105 while an operator (not shown) of the paint-striping machine 102 maintains the second visible guidance line 176 in alignment with the alignment mark 177. In addition or alternatively, the operator can maintain the first visible guidance line 174 in alignment a mark corresponding to the second location 182. The former technique may be well suited for daytime operations when the sunlight reduces the visibility of the first visible guidance line 174. The latter technique may be well suited for nighttime operations when the first visible guidance line 174 is readily visible even at long distances.

Figure 13:
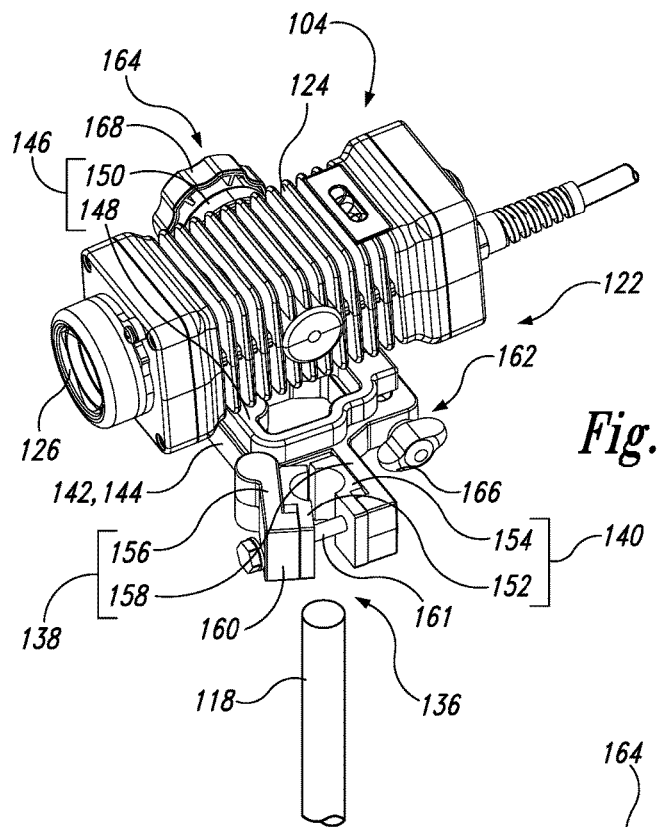
FIGS. 13 and 14 are, respectively, perspective views from the top and one side of the guidance system and the second outrigger shown in FIG. 1 before and after the guidance system is adjustably connected to the second outrigger.
Figure 14:
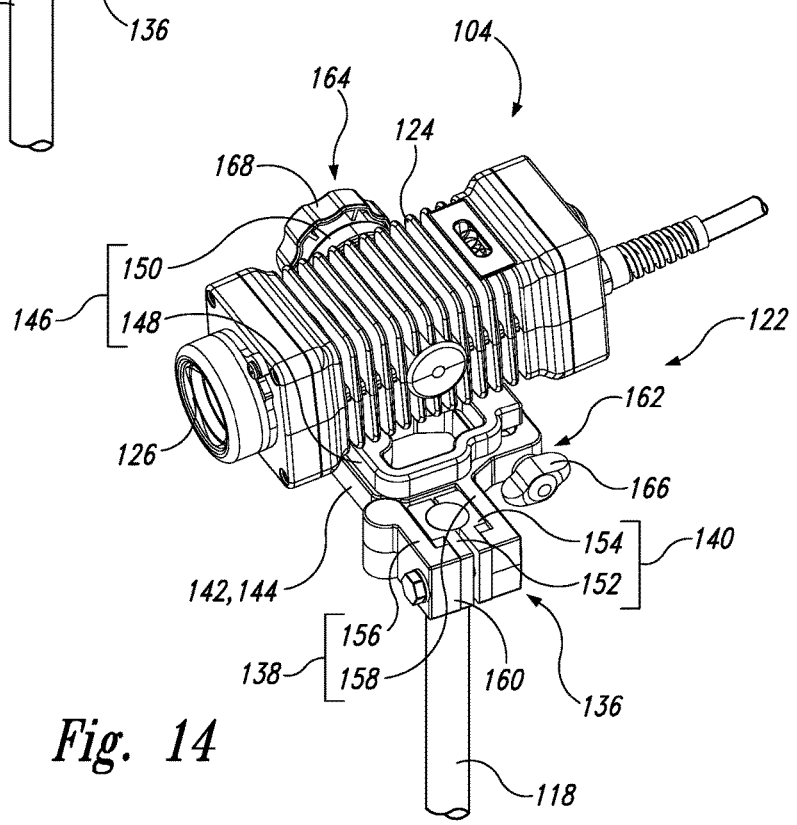
Figure 15:
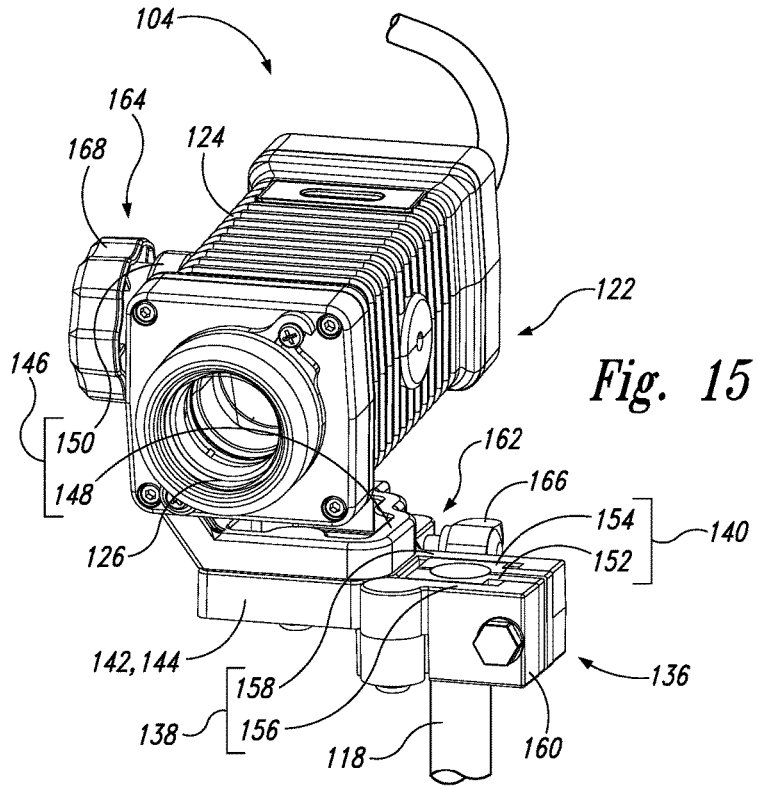
FIG. 15 is another perspective view from the top and one side of the guidance system and the second outrigger shown in FIG. 1.
Figure 16:
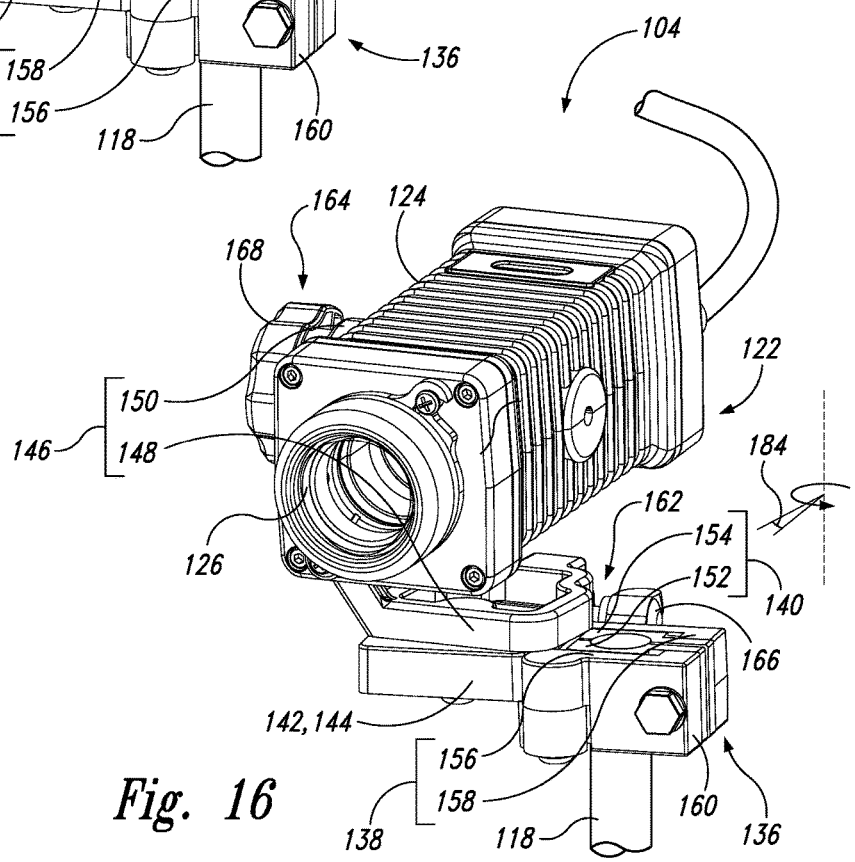
FIG. 16 is a perspective view from the top and one side of the guidance system and the second outrigger shown in FIG. 1 after a mounting and containment assembly of the guidance system is adjusted relative to its position in FIG. 15 to change a yaw angle of the planar light region shown in FIGS. 9 and 10.

FIGS. 13-18 are perspective views from the top and one side of the guidance system 104 and the second outrigger 112 with the guidance system 104 in various states of connection and/or adjustment. In particular, FIGS. 13 and 14 are, respectively, perspective views of the guidance system 104 and the second outrigger 112 before and after the guidance system 104 is adjustably connected to the second outrigger 112. FIG. 15 is another perspective view of the guidance system 104 and the second outrigger 112. FIGS. 16-18 are perspective views of the guidance system 104 and the second outrigger 112 after different adjustments of the guidance system 104 relative to its state in FIG. 15. As shown in FIGS. 13 and 14, the swing arm 156 can be moved toward or away from the fixed arm 158 to secure or release the clamp 136 to the second rod 118. As shown in FIG. 16 relative to FIG. 15 and with reference to FIG. 9, the first adjustment mechanism 162 can be operated to change a yaw angle 184 of the planar light region 170. As shown in FIG. 17 relative to FIG. 15 and with reference to FIG. 9, the second adjustment mechanism 164 can be operated to change a pitch angle 186 of the planar light region 170. As shown in FIG. 18 relative to FIG. 15 and with reference to FIG. 9, rotating the frame 138 relative to the gripper 140 at the clasp 160 can change a roll angle 188 of the planar light region 170.

Figure 19A:
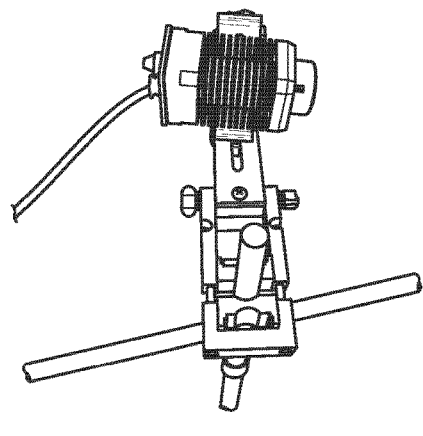
FIG. 19A-21 are perspective views illustrating different mounting options for mounting and containment assemblies of guidance systems of paint-striping systems in accordance with embodiments of the present technology.
Figure 19B:
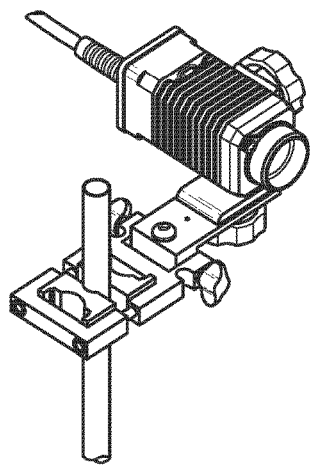
Figure 20A:
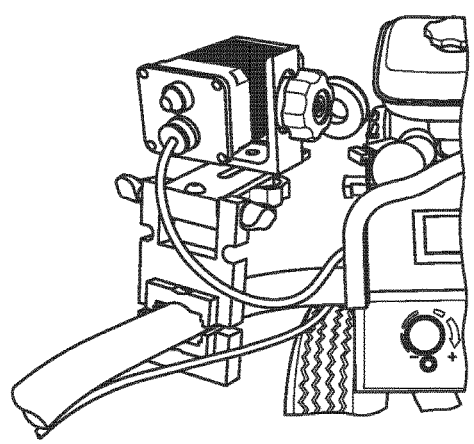
Figure 20B:
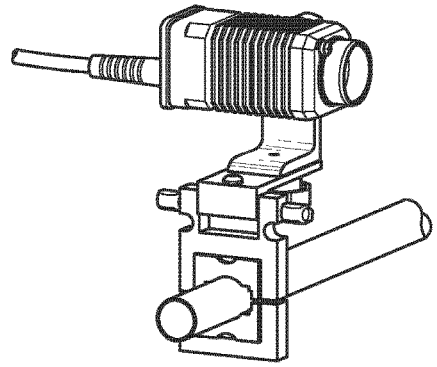
Figure 21:
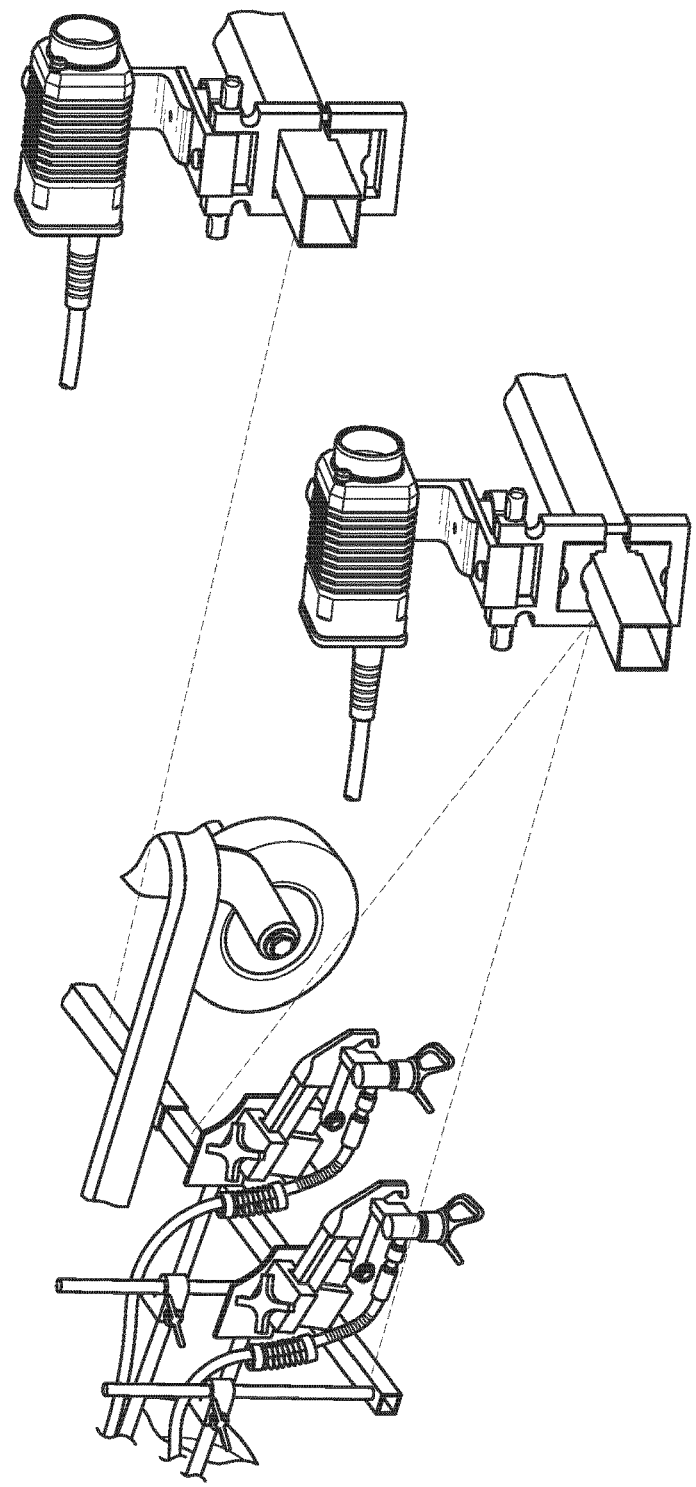

FIG. 19A-21 are perspective views illustrating different mounting options for mounting and containment assemblies of guidance systems of paint-striping systems in accordance with embodiments of the present technology. As shown in FIGS. 19A and 19B, a mounting and containment assembly of a guidance system of a paint striping-system in accordance with some embodiments of the present technology is mounted to a small round rod also carrying a paint-dispensing nozzle of the paint striping-system. As shown in FIGS. 20A and 20B, a mounting and containment assembly of a guidance system of a paint-striping system in accordance with some embodiments of the present technology is mounted to a large round rod. As shown in FIG. 21, a mounting and containment assembly of a guidance system of a paint striping-system in accordance with some embodiments of the present technology is mounted to one of several suitable positioned on a square rod of an outrigger also carrying two paint-dispensing nozzles of the paint striping-system.

Figure 22:
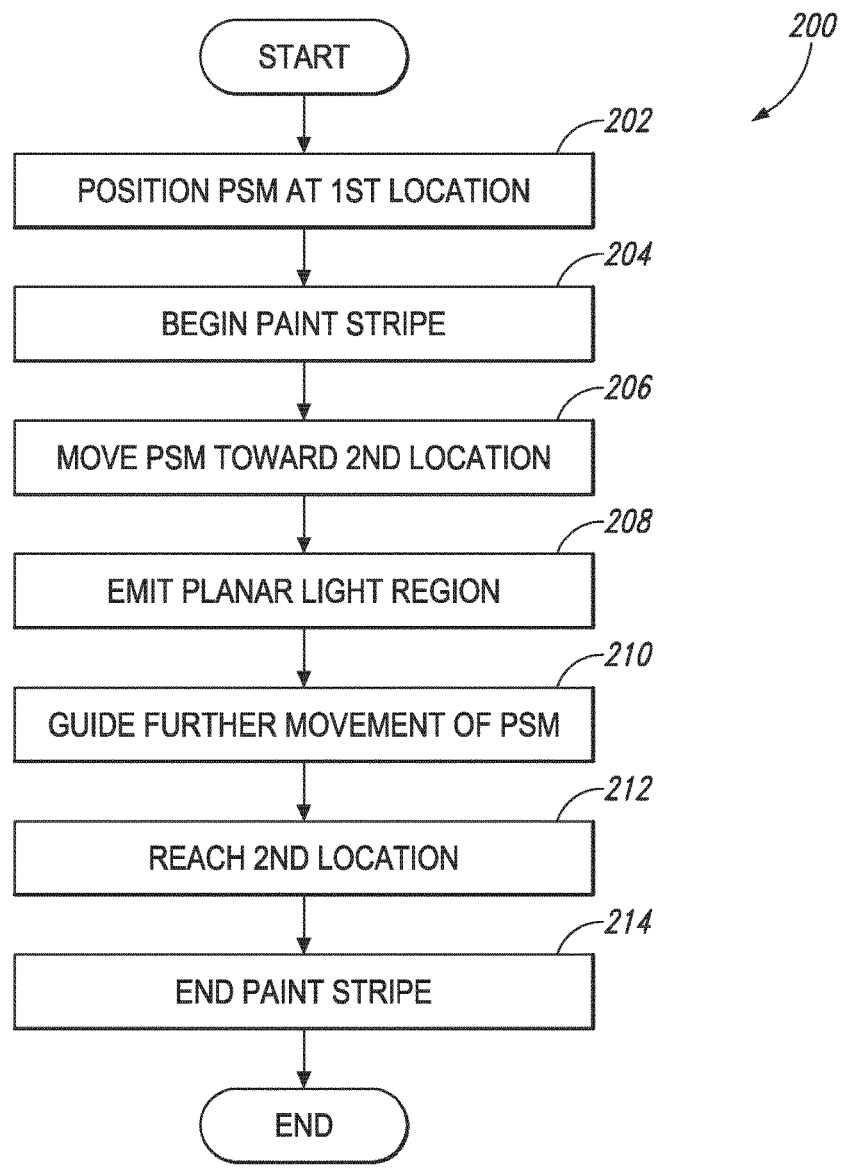
FIG. 22 is a flow chart illustrating a method for operating the paint-striping system shown in FIG. 1 in accordance with an embodiment of the present technology.

FIG. 22 is a flow chart illustrating a method 200 for operating the paint-striping system 100 in accordance with an embodiment of the present technology. With reference to FIGS. 1-22 together, the method 200 can include positioning the paint-striping machine 102 ("PSM" in FIGS. 22-24) on the underfoot surface 172 at the first location 180 (block 202). When the paint-striping machine 102 is positioned at the first location 180, the nozzle 108 can be above a first end portion of a path for the planned paint stripe 178 on the underfoot surface 172. Next, the method 200 can include beginning the paint stripe 178 (block 204), such as by beginning to dispense paint from the nozzle 108. An operator can then move the paint-striping machine 102 along the underfoot surface 172 from the first location 180 toward the second location 182 while dispensing paint from the nozzle 108 onto the underfoot surface 172 to form a first portion of the paint stripe 178 (block 206). The method 200 can further include emitting the planar light region 170 from the guidance system 104 (block 208) while moving the paint-striping machine 102. The operator can use the planar light region 170 to guide further movement of the paint-striping machine 102 along the underfoot surface 172 toward the second location 182 (block 210) while dispensing paint from the nozzle 108 onto the underfoot surface 172, thereby continuing the paint stripe 178 along the path. For example, this guidance can be based on alignment of the first visible guidance line 174 with a first stationary reference (e.g., a mark at the second location 182) and/or alignment of the second visible guidance line 176 with a second stationary reference (e.g., the alignment mark 177). After the paint-striping machine 102 reaches the second location 182 (block 212), the method 200 can include ending the paint stripe 178 (block 214), such as by discontinuing a flow of paint through the nozzle 108. When the paint-striping machine 102 is at the second location 182, the nozzle 108 can be above an end portion of the path.

Figure 23:
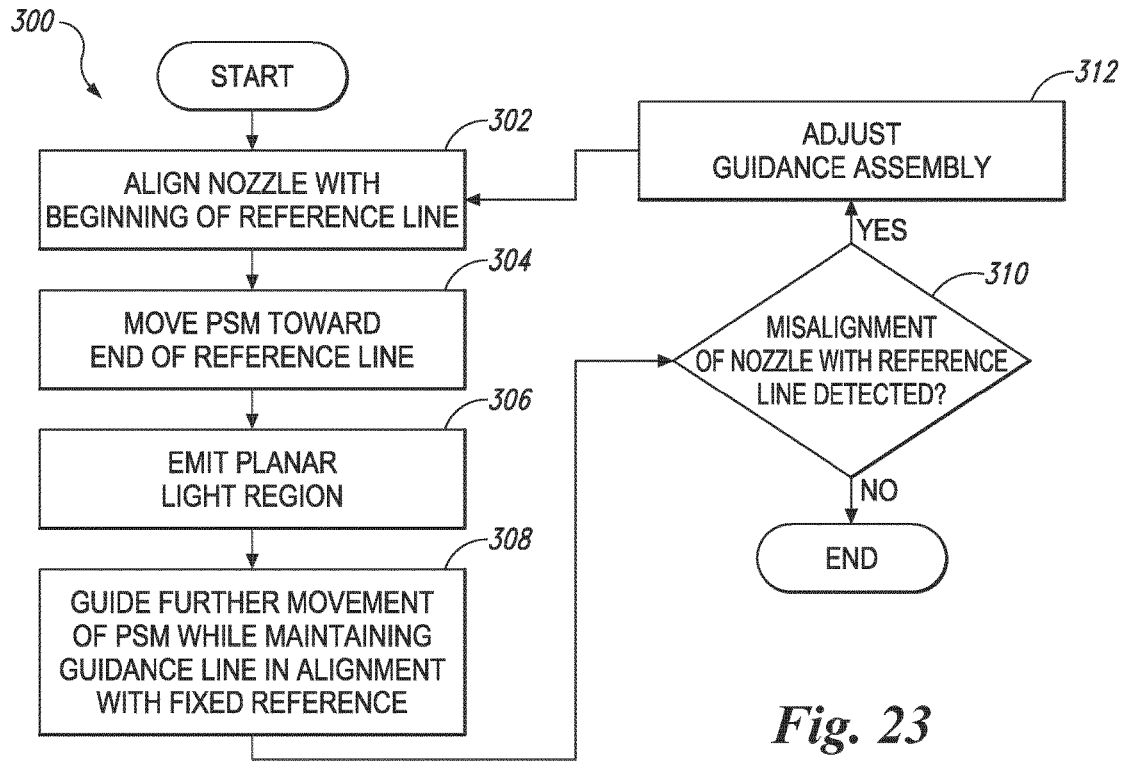
FIG. 23 is a flow chart illustrating a first calibration method for calibrating the paint-striping system shown in FIG. 1 in accordance with an embodiment of the present technology.

FIG. 23 is a flow chart illustrating a first calibration method 300 for calibrating the paint-striping system 100 in accordance with an embodiment of the present technology. This calibration can be carried out, for example, at the beginning of a job (e.g., a planned set of lines to be painted) and/or occasionally during a job. Due, for example, to the adjustment features of the guidance system 104, calibration of the paint-striping system 100 can be convenient and capable of producing excellent correspondence between the straightness of movement of the paint-striping machine 102 and visual feedback from the guidance system 104. The first calibration method 300 can be carried out on a reference line, such as an existing paint stripe, a curb, a chalk like, or some other newly formed or existing feature known to be straight. With reference to FIGS. 1-18 and 23 together, the first calibration method 300 can include positioning the paint-striping machine 102 so that the nozzle 108 is above a first end portion of the reference line (block 302). Next, the first calibration method 300 can include moving the paint-striping machine 102 toward an opposite second end portion of the reference line (block 304) while emitting the planar light region 170 from the guidance system 104 (block 306) to form the first visible guidance line 174, the second visible guidance line 176, or both.

In at least some embodiments, moving the paint-striping machine 102 a significant distance toward the second end portion of the reference line is useful to improve the effectiveness of the calibration. For example, the first calibration method 300 can include further moving the paint-striping machine 102 a distance of at least 50% (e.g., at least 75%) of a total distance from the first end portion of the reference line to the second end portion of the reference line while maintaining the first visible guidance line 174 in alignment with a stationary reference and/or maintaining the second visible guidance line 176 in alignment with a stationary reference. After and/or while further moving the paint-striping machine 102 along the reference line, alignment of the nozzle 108 with the reference line can also be monitored. If misalignment of the nozzle 108 with the reference line is detected (block 310), the first calibration method 300 can include adjusting the guidance system 104 to change the yaw angle 184 of the planar light region 170 (block 312). The first calibration method 300 can then be repeated until no misalignment of the nozzle 108 with the reference line is detected.

Figure 24:
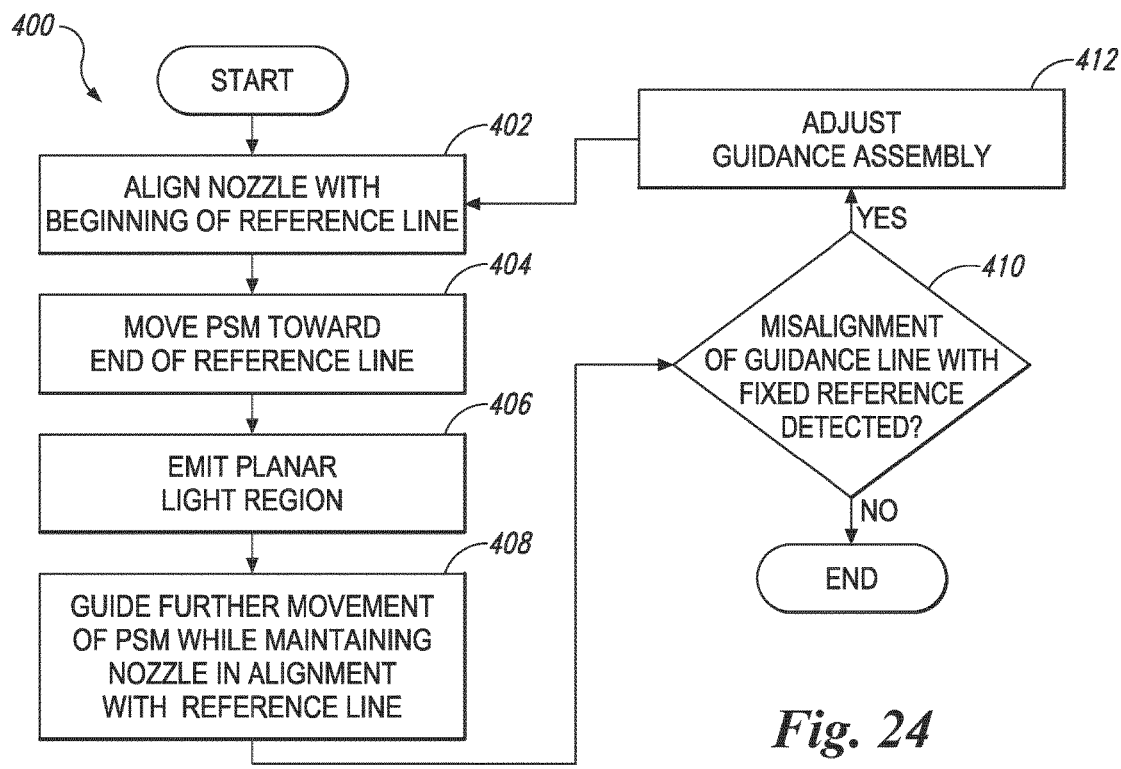
FIG. 24 is a flow chart illustrating a second calibration method for calibrating the paint-striping system shown in FIG. 1 in accordance with an embodiment of the present technology.

FIG. 24 is a flow chart illustrating a second calibration method 400 for calibrating the paint-striping system 100 in accordance with an embodiment of the present technology. The second calibration method 400 can be used in addition to or in place of the first calibration method 300 depending on field conditions. With reference to FIGS. 1-18 and 21 together, the second calibration method 400 can include positioning the paint-striping machine 102 so that the nozzle 108 is above the first end portion of the reference line (block 402). Next, the second calibration method 400 can include moving the paint-striping machine 102 toward the opposite second end portion of the reference line (block 404) while emitting the planar light region 170 from the guidance system 104 (block 406) to form the first visible guidance line 174, the second visible guidance line 176, or both. The second calibration method 400 can further include further moving the paint-striping machine 102 a distance of at least 50% (e.g., at least 75%) of a total distance from the first end portion of the reference line to the second end portion of the reference line while maintaining the nozzle 108 in alignment with the reference line. After and/or while further moving the paint-striping machine 102 along the reference line, alignment of the first visible guidance line 174 with a stationary reference and/or alignment of the second visible guidance line 176 with a stationary reference can also be monitored. If misalignment of the first and/or second visible guidance lines 174, 176 is detected (block 410), the second calibration method 400 can include adjusting the guidance system 104 to change the yaw angle 184 of the planar light region 170 (block 412). The second calibration method 400 can then be repeated until no misalignment of the first and/or second visible guidance lines 174, 176 is detected.

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments can also exhibit such advantages, and not all embodiments need necessarily exhibit such advantages or other advantages disclosed herein to fall within the scope of the present technology. Accordingly, this disclosure and associated technology can encompass other embodiments not expressly shown or described herein.

Certain aspects of the present technology may take the form of computer-executable instructions, including routines executed by a controller or other data processor. In at least some embodiments, a controller or other data processor is specifically programmed, configured, and/or constructed to perform one or more of these computer-executable instructions. Furthermore, some aspects of the present technology may take the form of data (e.g., non-transitory data) stored or distributed on computer-readable media, including magnetic or optically readable and/or removable computer discs as well as media distributed electronically over networks. Accordingly, data structures and transmissions of data particular to aspects of the present technology are encompassed within the scope of the present technology. The present technology also encompasses methods of both programming computer-readable media to perform particular steps and executing the steps.

The methods disclosed herein include and encompass, in addition to methods of practicing the present technology (e.g., methods of making and using the disclosed devices and systems), methods of instructing others to practice the present technology. For example, a method in accordance with a particular embodiment includes positioning a paint-striping machine at a first location, moving the paint-striping machine from the first location toward a second location while dispensing paint, emitting a planar light region having a vertical orientation to form a guidance line while moving the paint-striping machine, and guiding further movement of the paint-striping machine toward the second location based on an alignment of the guidance line with a stationary reference. A method in accordance with another embodiment includes instructing such a method.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

We claim:

1. A method for operating a paint-striping system, the method comprising:
   positioning a paint-striping machine at a first location, wherein a downwardly oriented nozzle of the paint-striping machine is above a first end portion of a path for a planned paint stripe on pavement when the paint-striping machine is at the first location;
   moving the paint-striping machine along the pavement from the first location toward a second location while dispensing paint from the nozzle onto the pavement to form a paint stripe along the path, wherein the nozzle is above an opposite second end portion of the path when the paint-striping machine is at the second location;
   emitting, from a guidance system operably connected to the paint-striping machine, a planar light region having a vertical orientation while moving the paint-striping machine, wherein emitting the planar light region forms a visible guidance line; and
   guiding further movement of the paint-striping machine along the pavement toward the second location while maintaining an alignment of the guidance line with a stationary reference while dispensing paint from the nozzle onto the pavement to continue the paint stripe along the path.

2. The method of claim 1 wherein:
   moving the paint-striping machine includes moving the paint-striping machine toward a portable target having a reflective surface facing toward the paint-striping machine; and
   emitting the planar light region includes emitting the planar light region such that the planar light region forms the visible guidance line on the reflective surface.

3. The method of claim 1 wherein:
   moving the paint-striping machine includes moving the paint-striping machine toward a mark on the pavement designating the second end portion of the path; and
   emitting the planar light region includes emitting the planar light region such that the planar light region forms the visible guidance line on the pavement.

4. The method of claim 1 wherein emitting the planar light region includes emitting the planar light region from a light-emitting device of the guidance system, and wherein the light-emitting device is carried by an outrigger of the paint-striping machine.

5. The method of claim 1, wherein:
   the guidance system includes
      a light-emitting device configured to form the planar light region, and a mounting and containment assembly configured to provide an adjustable connection between the light-emitting device and the paint-striping machine; and the method further comprises operably connecting the light-emitting device to the paint-striping machine via the mounting and containment assembly.

6. The method of claim 5 wherein operably connecting the light-emitting device to the paint-striping machine includes operably connecting the light-emitting device to the paint-striping machine via an outrigger of the paint-striping machine.

7. The method of claim 5 wherein operably connecting the light-emitting device to the paint-striping machine includes releasably connecting the light-emitting device to the paint-striping machine via a clamp of the mounting and containment assembly.

8. The method of claim 1, wherein:
the guidance system includes
a light-emitting device configured to form the planar light region, and
a mounting and containment assembly configured to provide an adjustable connection between the light-emitting device and the paint-striping machine; and
the method further comprises adjusting the mounting and containment assembly to change a yaw angle of the planar light region while the light-emitting device is operably connected to the paint-striping machine.

9. The method of claim 8 wherein adjusting the mounting and containment assembly to change the yaw angle of the planar light region includes slidably operating an adjustment mechanism of the mounting and containment assembly to change the yaw angle of the planar light region.

10. The method of claim 1, wherein:
the guidance system includes
a light-emitting device configured to form the planar light region, and
a mounting and containment assembly configured to provide an adjustable connection between the light-emitting device and the paint-striping machine; and
the method further comprises adjusting the mounting and containment assembly to change a pitch angle of the planar light region while the light-emitting device is operably connected to the paint-striping machine.

11. The method of claim 10 wherein adjusting the mounting and containment assembly to change the pitch angle of the planar light region includes rotatably operating an adjustment mechanism of the mounting and containment assembly to change the pitch angle of the planar light region.

12. The method of claim 1, wherein:
the guidance system includes
a light-emitting device configured to form the planar light region, and
a mounting and containment assembly configured to provide an adjustable connection between the light-emitting device and the paint-striping machine; and
the method further comprises adjusting the mounting and containment assembly to change a roll angle of the planar light region while the light-emitting device is operably connected to the paint-striping machine.

13. The method of claim 1 wherein the guidance system includes a light-emitting device configured to form the planar light region, and wherein emitting the planar light region includes passing light from a laser of the light-emitting device through a fan lens of the light-emitting device.

14. The method of claim 1 wherein the pavement is pavement of a parking lot.

15. The method of claim 1 wherein the paint-striping machine is a walk-behind paint-striping machine.

16. The method of claim 1 wherein the paint-striping machine is a riding paint-striping machine.

17. A method for operating a paint-striping system, the method comprising:
operating an adjustment mechanism of a mounting and containment assembly of a guidance system operably connected to a paint-striping machine to change a yaw angle of a planar light region to be emitted from the guidance system;
positioning the paint-striping machine at a first location, wherein a downwardly oriented nozzle of the paint-striping machine is above a first end portion of a path for a planned paint stripe on pavement when the paint-striping machine is at the first location;
moving the paint-striping machine along the pavement from the first location toward a second location while dispensing paint from the nozzle onto the pavement to form a paint stripe along the path, wherein the nozzle is above an opposite second end portion of the path when the paint-striping machine is at the second location;
emitting, from the guidance system, the planar light region while moving the paint-striping machine, wherein emitting the planar light region forms a visible guidance line; and
guiding further movement of the paint-striping machine along the pavement toward the second location while maintaining an alignment of the guidance line with a stationary reference while dispensing paint from the nozzle onto the pavement to continue the paint stripe along the path.

18. The method of claim 17 wherein operating the adjustment mechanism includes slidably operating the adjustment mechanism.

19. The method of claim 17 wherein the adjustment mechanism is a first adjustment mechanism, and wherein the method further comprises operating a second adjustment mechanism of the mounting and containment assembly to change a pitch angle of the planar light region.

20. The method of claim 19 wherein operating the second adjustment mechanism includes rotatably operating the second adjustment mechanism.

* * * * *